US009688416B2

United States Patent
Ahlbrecht et al.

(10) Patent No.: US 9,688,416 B2
(45) Date of Patent: Jun. 27, 2017

(54) SYSTEM AND METHOD FOR ISOLATING ATTITUDE FAILURES IN AIRCRAFT

(71) Applicant: Honeywell International Inc., Morristown, NJ (US)

(72) Inventors: Mark A. Ahlbrecht, Champlin, MN (US); Michael R. Ibis, Maple Grove, MN (US); John R. Morrison, Minneapolis, MN (US)

(73) Assignee: Honeywell International Inc, Morris Plains, NJ (US)

( * ) Notice: Subject to any disclaimer, the term of this patent is extended or adjusted under 35 U.S.C. 154(b) by 0 days.

(21) Appl. No.: 14/575,762

(22) Filed: Dec. 18, 2014

(65) Prior Publication Data
US 2016/0107761 A1   Apr. 21, 2016

Related U.S. Application Data (60) Provisional application No. 62/065,868, filed on Oct. 20, 2014.

(51) Int. Cl.
   *B64D 43/00*   (2006.01)
   *B64D 45/00*   (2006.01)
   (Continued)

(52) U.S. Cl.
   CPC .............. *B64D 43/00* (2013.01); *B64D 45/00* (2013.01); *G01C 9/005* (2013.01); *G01C 21/165* (2013.01); *G01C 23/00* (2013.01); *G01S 19/53* (2013.01)

(58) Field of Classification Search
   CPC ........ B64D 43/00; B64D 45/00; G01C 9/005; G01S 19/53
   (Continued)

(56) References Cited

U.S. PATENT DOCUMENTS 3,505,641 A * 4/1970 Boskovich ............. B64D 45/00
                                                     244/194
4,914,598 A    4/1990 Krogmann et al.
(Continued)

FOREIGN PATENT DOCUMENTS

| EP | 2685214 | 4/2013 |
| WO | 2009130576 | 10/2009 |

OTHER PUBLICATIONS

Miller et al., "Systems and Methods for Producing Two Independent Dissimilar Attitude Solutions, Two Independent Dissimilar Inertial Solutions or Both From One Improved Navigation Device", "U.S. Appl. No. 14/560,319, filed Dec. 4, 2014", pp. 1-21.
(Continued)

*Primary Examiner* — Thomas Tarcza
*Assistant Examiner* — Michael Berns
(74) *Attorney, Agent, or Firm* — Fogg & Powers LLC (57) ABSTRACT

Systems and methods for isolating attitude failures are provided. In one embodiment, an attitude integrity and display system comprises a display system comprising a primary system displaying a first attitude solution and a standby system displaying a second attitude solution; an attitude integrity system generating an attitude integrity (AI) solution calculated from measurements from an attitude solution data source, the AI solution comprising an aircraft roll and pitch, the data source providing data independent from any data generated by inertial sensor flight instruments and not displayed on either the primary or the standby systems; and an attitude monitor that compares the first solution against the second solution. When the first solution deviates from the second solution by more than a threshold, the monitor identifies on the display system which of either the first or the second solution is failed based on which has a greater deviation from the AI solution.

20 Claims, 6 Drawing Sheets

(51) Int. Cl.
*G01S 19/53* (2010.01)
*G01C 9/00* (2006.01)
*G01C 21/16* (2006.01)
*G01C 23/00* (2006.01)

(58) Field of Classification Search
USPC .......................................................... 701/4
See application file for complete search history.

(56) References Cited

U.S. PATENT DOCUMENTS

| | | | |
|---|---|---|---|
| 6,266,582 B1 | 7/2001 | Bruckner | |
| 6,285,298 B1 | 9/2001 | Gordon | |
| 6,341,248 B1 | 1/2002 | Johnson | |
| 6,405,107 B1 | 6/2002 | Derman | |
| 6,654,685 B2 * | 11/2003 | McIntyre | G05D 1/0077 244/3.2 |
| 6,907,332 B1 * | 6/2005 | Huynh | H05K 7/1412 174/50 |
| 6,940,427 B2 | 9/2005 | Bateman | |
| 7,107,833 B2 | 9/2006 | Osborne | |
| 8,082,099 B2 * | 12/2011 | Latif | G01C 21/165 701/472 |
| 8,204,635 B2 | 6/2012 | Manfred et al. | |
| 8,412,389 B2 | 4/2013 | Tessier | |
| 8,441,396 B2 * | 5/2013 | Parmet | H04L 1/08 342/172 |
| 8,538,607 B2 * | 9/2013 | Manfred | G01C 21/165 33/352 |
| 8,665,120 B2 * | 3/2014 | Thoreen | G01C 23/005 340/971 |
| 9,037,318 B2 * | 5/2015 | Manfred | G01C 21/165 33/352 |
| 9,261,883 B2 | 2/2016 | Ishihara et al. | |
| 2002/0079403 A1 | 6/2002 | Boe | |
| 2010/0152929 A1 | 6/2010 | Manfred et al. | |
| 2011/0172855 A1 | 7/2011 | Marstall et al. | |
| 2011/0184594 A1 | 7/2011 | Manfred et al. | |
| 2011/0205090 A1 | 8/2011 | Marstall et al. | |
| 2013/0238172 A1 | 9/2013 | Manfred et al. | |
| 2015/0308832 A1 * | 10/2015 | Coatantiec | G01C 5/005 701/4 |

OTHER PUBLICATIONS

Carminati, "Fault detection and isolation enhancement of an aircraft attitude and heading reference system based on MEMS inertial sensors", "Procedia Chemistry", Aug. 31, 2009, pp. 509-512, Publisher: Elsevier B.V.

Kim et al, "FDI for Inertial Sensor Using Single Antenna GPS Receiver", "16th IFAC Symposium on Automatic Control in Aerospace (IFAC AVA 2004)", Jun. 2004, pp. 1-6, Publisher: Seoul National University.

European Patent Office, "Extended European Search Report from EP Application No. 15188385.7 mailed Feb. 17, 2016", "from Foreign Counterpart of U.S. Appl. No. 14/560,319", Feb. 17, 2016, pp. 1-14, Published in: EP.

European Patent Office, "Extended European Search Report from EP Application No. 15189664.4 mailed Mar. 15, 2016", "from Foreign Counterpart of U.S. Appl. No. 14/575,762", Mar. 15, 2016, pp. 1-7, Published in: EP.

European Patent Office, "Communication pursuant to Article 94(3) EPC from EP Application No. 15188385.7 mailed Jul. 4, 2016", "from Foreign Counterpart of U.S. Appl. No. 14/560,319", Jul. 4, 2016, pp. 1-12, Published in: EP.

United States Patent and Trademark Office, "Office Action", "from U.S. Appl. No. 14/560,319", Oct. 26, 2016, pp. 1-37, Published in: US.

United States Patent and Trademark Office, "Final Office Action", "From U.S. Appl. No. 14/560,319", Mar. 28, 2017, pp. 1-11, Published in: US.

European Patent Office, "Office Action from EP Application No. 15188385.7 mailed Apr. 12, 2017", "From Foreign Counterpart of U.S. Appl. No. 14/560,319", Apr. 12, 2017, pp. 1-11, Published in: EP.

* cited by examiner

SYSTEM AND METHOD FOR ISOLATING ATTITUDE FAILURES IN AIRCRAFT

CROSS-REFERENCE TO RELATED APPLICATIONS

This application in a non-provisional patent application claiming priority to, and the benefit of, U.S. Provisional Patent Application No. 62/065,868 entitled "SYSTEM AND METHOD FOR ISOLATING ATTITUDE FAILURES IN AIRCRAFT" filed on Oct. 20, 2014, which is herein incorporated by reference in its entirety.

BACKGROUND

In an aircraft, especially commercial aircraft, there is a minimum configuration of equipment that is required to be operational for the aircraft to depart. For attitude instrumentation (which provide aircraft pitch and roll indications) the current state of the art requires some aircraft types to have two primary attitude sources and a secondary attitude source in order for the aircraft to depart. Attitude measurements from the two primary attitude sources are displayed on the primary display system, which includes separate screens for both the pilot and the co-pilot. The secondary, or standby, attitude source is displayed on a standby display system. The reason three total systems are required to be operable prior to takeoff is so that misleading information can be readily identified. That is, if one of the attitude sources starts presenting misleading information while the aircraft is in flight, the other two sources should still be in agreement so that the misleading source is quickly identified. If any of the three attitude sources are failed prior to departure, the aircraft cannot depart and the aircraft operator (such as an airline, for example) will incur significant costs to delay or cancel the flight until the aircraft can be brought up to minimum configuration. To avoid incurring these expenses, airlines could maintain significant and distributed pools of spare attitude instrumentation devices, so that a replacement device can quickly be installed and the aircraft returned to an operation configuration. The cost of maintaining these pools, while less than the costs of cancellation or delay, are still very significant.

For the reasons stated above and for other reasons stated below which will become apparent to those skilled in the art upon reading and understanding the specification, there is a need in the art for alternate systems and methods for isolating attitude failures in aircraft with minimum equipment list configurations.

SUMMARY

The Embodiments of the present invention provide methods and systems for isolating attitude failures in aircraft and will be understood by reading and studying the following specification.

Systems and methods for isolating attitude failures are provided. In one embodiment, an attitude integrity and display system for an aircraft comprises: a display system comprising a primary aircraft display system for displaying a first attitude solution and a standby aircraft display system for displaying a second attitude solution; an attitude integrity system generating an attitude integrity (AI) solution calculated from one or more measurements provided by an attitude solution data source, the AI solution comprising an aircraft roll measurement and an aircraft pitch measurement, wherein the attitude solution data source provides data independent from any data generated by inertial sensor flight instruments aboard the aircraft, and wherein the AI solution is not displayed on either the primary aircraft display system or the standby aircraft display system; and an attitude monitor coupled to the attitude integrity system, wherein the attitude monitor compares the first attitude solution against the second attitude solution, wherein when the first attitude solution deviates from the second attitude solution by more than a threshold, the attitude monitor identifies on the display system which of either the first attitude solution or the second attitude solution is a failed solution based on which of the first attitude solution or the second attitude solution has a greater deviation from the attitude integrity solution.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide system and methods for a specialized, non-navigation grade, lower cost attitude source that is designed for the primary purpose of isolating hazardously misleading information rather than for outputting attitude information used for flying the aircraft. With the embodiments disclosed herein the minimum configuration of operating primary attitude sources can be reduced by one. An operating configuration suitable for flying the aircraft would then include one secondary attitude source, and one primary attitude source. By reducing the number of attitude sources needed to establish an operating configuration, the embodiments described herein could be used to either (1) reduce the level of redundancy of equipment on board the aircraft thereby reducing the aircraft recurring cost, and/or (2) reduce the sparing requirements and costs.

For example, in some implementations, embodiments of the present disclosure provide sufficient capability at the aircraft architectural level to allow an aircraft to take-off and operate in-flight with one of the aircraft's primary ADIRU's failed. With such an embodiment, if an otherwise undetected erroneous attitude error occurs in pitch or roll on either the remaining ADIRU or ADAHRU, the crew can determine which is the failed channel. In some implementations, the level of discrimination is within +/−5 degrees of true pitch and +/−10 degrees of true roll. Further, embodiments described herein provide for a diversity of equipment to mitigate the risk that the attitude integrity function might have a common failure mode that would otherwise result in improper identification and isolation of an attitude channel.

Figure 1:
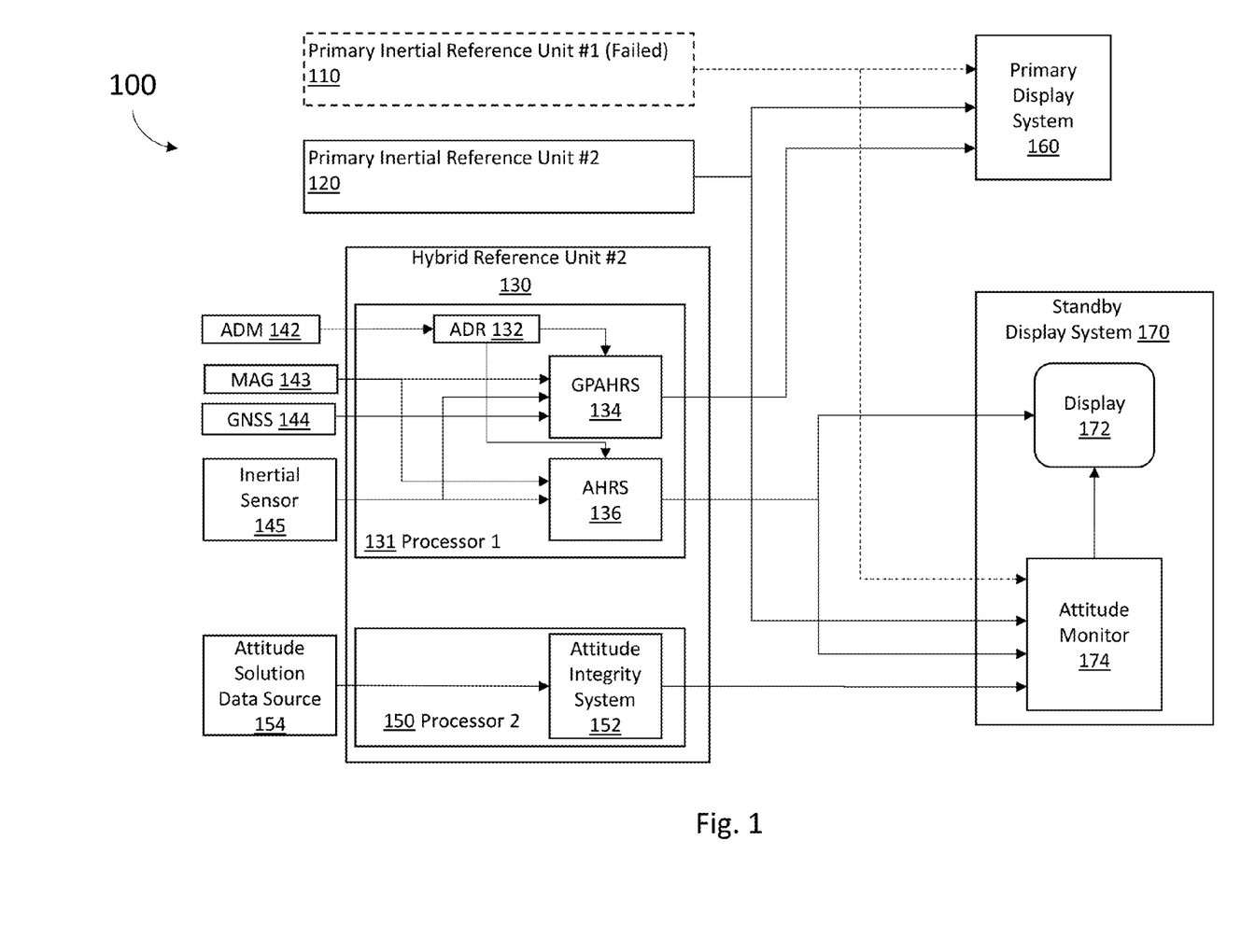
FIG. 1 is a diagram illustrating an attitude display system of one embodiment of the present disclosure.

FIG. 1 is a block diagram illustrating an attitude integrity and display system 100 of one embodiment of the present disclosure. In the embodiment presented in FIG. 1, attitude display system 100 comprises independent first and second primary inertial reference units (shown at 110 and 120) and a hybrid reference unit (shown at 130). In the particular implementation shown in FIG. 1, the first primary inertial reference unit comprises a first air data inertial reference unit (ADIRU) 110, the second primary inertial reference unit comprises a second air data inertial reference unit (ADIRU) 120, and the hybrid reference unit comprises an air data attitude hybrid reference unit (ADAHRU) 130. ADIRU 110 and ADIRU 120 each derive primary attitude data suitable for aircraft navigation from navigation-grade inertial navigation sensors, such as, but not limited to, a ring laser gyroscope. Such navigation-grade inertial sensors may also be referred to as inertial sensor flight instruments because their measurements are of sufficient accuracy to display to the pilot and for the pilot to use for navigating the aircraft. ADAHRU 130 is a navigation device which provides multiple navigation solutions derived from a diversified set of sensor data. For example, in the embodiment shown in FIG. 1, ADAHRU 130 comprises an Air Data Reference (ADR) 132, a hybrid Global Positioning and Attitude and Heading Reference System (GPAHRS) 134, and a stand-alone Attitude and Heading Reference System (AHRS) 136.

In one embodiment, GPAHRS 134 is coupled to ADR 132, a magnetometer 143 and at least one Global Navigation Satellite System (GNSS) receiver 144 (which may be a Global Positioning System (GPS) receiver for example). In operation, GPAHRS 134 utilizes altitude data from ADR 132, ranging or position information from a GNSS receiver 144, inertial sensors 145 and magnetic field data from magnetometer 143 to produce an attitude solution. This attitude solution from GPAHRS 134 is displayed on the pilots' primary display system 160 and is suitable for aircraft navigation when the GPAHRS is operating in primary mode with GNSS aiding. In other words, when the GNSS data is available, GPAHRS 134 produces an attitude solution of equivalent quality and performance as the attitude solutions generated by ADIRUs 110 and 120. Outside of the primary mode (e.g., when the availability of GNSS data is lost) the GPAHRS 134 is coasting. While coasting, performance of the GPAHRS 130 is dependent on factor such as aircraft dynamics and magnetometer data. It should be noted that the attitude solution produced by the GPAHRS 134 is derived using dissimilar inputs and methods as the inertial data derived solutions produced by the ADIRU 110 and 120. The GPAHRS 134 solution produces a GNSS aided solution for attitude that is sent to the primary display system 160 for display to the pilots as a secondary solution and accordingly is of sufficient accuracy for the pilot to use for navigating the aircraft.

With respect to AHRS 136 in one embodiment, it is also coupled to ADR 132 and a magnetometer 143, and an inertial sensor 145. Inertial sensor 145 comprises an AHRS-grade inertial sensor, such as but not limited to a micro-electromechanical (MEMS) inertial sensor, for example. AHRS 136 is designed to derive an attitude solution for the aircraft based on body rates, accelerations and altitude, intentionally independent of GNSS aiding sources. AHRS 136 may also calculate a heading that is dependent on the magnetometer and has the same heading sub-modes as the GPAHRS 134 solution. The AHRS 136 attitude solution may also include a vertical loop filter that is dependent on the altitude data from ADR 132. When altitude data is not available, the vertical parameters are also not available. The AHRS 132 solution produces a completely unaided solution for attitudes that is sent to the standby display system 170 for display to the pilots on standby display 172 as a secondary solution and accordingly is of sufficient accuracy for the pilot to use for navigating the aircraft.

With embodiments of the present disclosure, attitude display system 100 comprises an additional attitude detection system that produces an attitude solution (both pitch and roll) independent from those used to provide attitude information to the primary and standby display systems (160, 170) for communication to the aircraft's pilots. This independent attitude solution is referred to herein as the Attitude Integrity (AI) solution.

As further illustrated by FIG. 1, in one embodiment, the hybrid reference unit 130 (i.e., ADAHRU 130) further comprises an attitude integrity system 152 coupled to an attitude solution data source 154. In one embodiment, the attitude solution data source 154 comprises a relatively inexpensive, non-navigation grade, inertial measurement unit such as a MEMS inertial sensor, for example. In other embodiments, the attitude solution data source 154 may provide sensors or other instrumentation providing one or more of inertial measurements, magnetometer measurements, GNSS measurements, air data measurements, or similar data from which aircraft attitude (pitch and roll) can be approximated, or combinations thereof.

The AI solution is used, as explained below, in the event that one of the navigation devices described above is out-of-service such that the pilot must rely on attitude data presented on the remaining instrument displays. Even then, the AI solution is only used when there is a disagreement between the data presented on the remaining in-service instruments. In that case, the AI solution determines which of the remaining attitude indications can be trusted by the pilot, and which should be locked-out or otherwise disregarded. Because the AI solution itself is never displayed to the pilots on any instrument display, neither the attitude integrity system 152 nor the attitude solution data source 154 need to be navigation-grade systems for the purpose of providing navigation-grade quality measurements. Further, because the AI solution is developed using diverse and independent processes with respect to the other attitude solutions, is will not be susceptible to common mode failures that might affect the other attitude solutions.

In the embodiment shown in FIG. 1, the AI solution is transmitted from the attitude integrity system 152 to an attitude monitor 174, which may be included within the standby display system 170. The attitude monitor 174 makes the final determination as to when there is a failed device and when attitude channel isolation is required. As shown in FIG. 1, the standby display system 172 includes an instrument display 172 that displays to the pilots the secondary attitude solution generated by AHRS 136. For diversity purposes, the standby display system 172 performs its functions using dissimilar hardware and processes with respect to the primary display system 160 which displays the ADIRU 110, ADIRU 120 and GPAHRS 134 generated attitude solutions.

Attitude monitor 174 also receives primary attitude data from the ADIRU 110 and ADIRU 120 as well as the secondary attitude data generated by AHRS 136. As explained in greater detail below, in the situation where one of the ADIRU 110 or ADIRU 120 is known to be failed or otherwise out of service, the attitude monitor 174 begins monitoring and comparing the primary attitude solution from the remaining ADIRU against the secondary attitude solution from the AHRS 136. In this mode, if a deviation between the remaining primary attitude solution and the secondary attitude solution exceeds a threshold, the AI solution is used for the purpose of determining whether it is the remaining primary altitude solution that is correct and can be trusted, or whether it is the secondary attitude solution that is correct and can be trusted.

Figure 2:
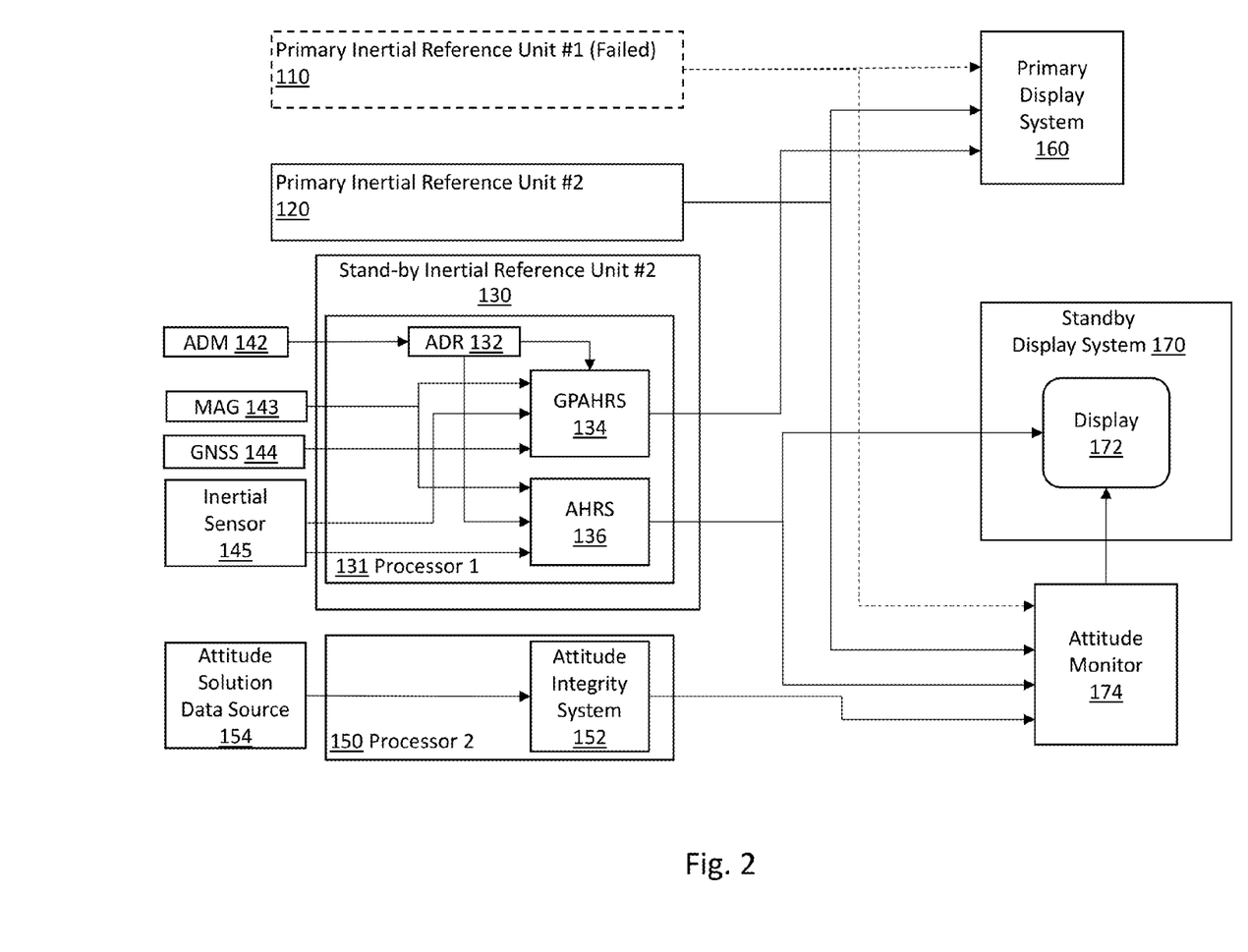
FIG. 2 is a diagram illustrating an attitude display system of one embodiment of the present disclosure.
Figure 3:
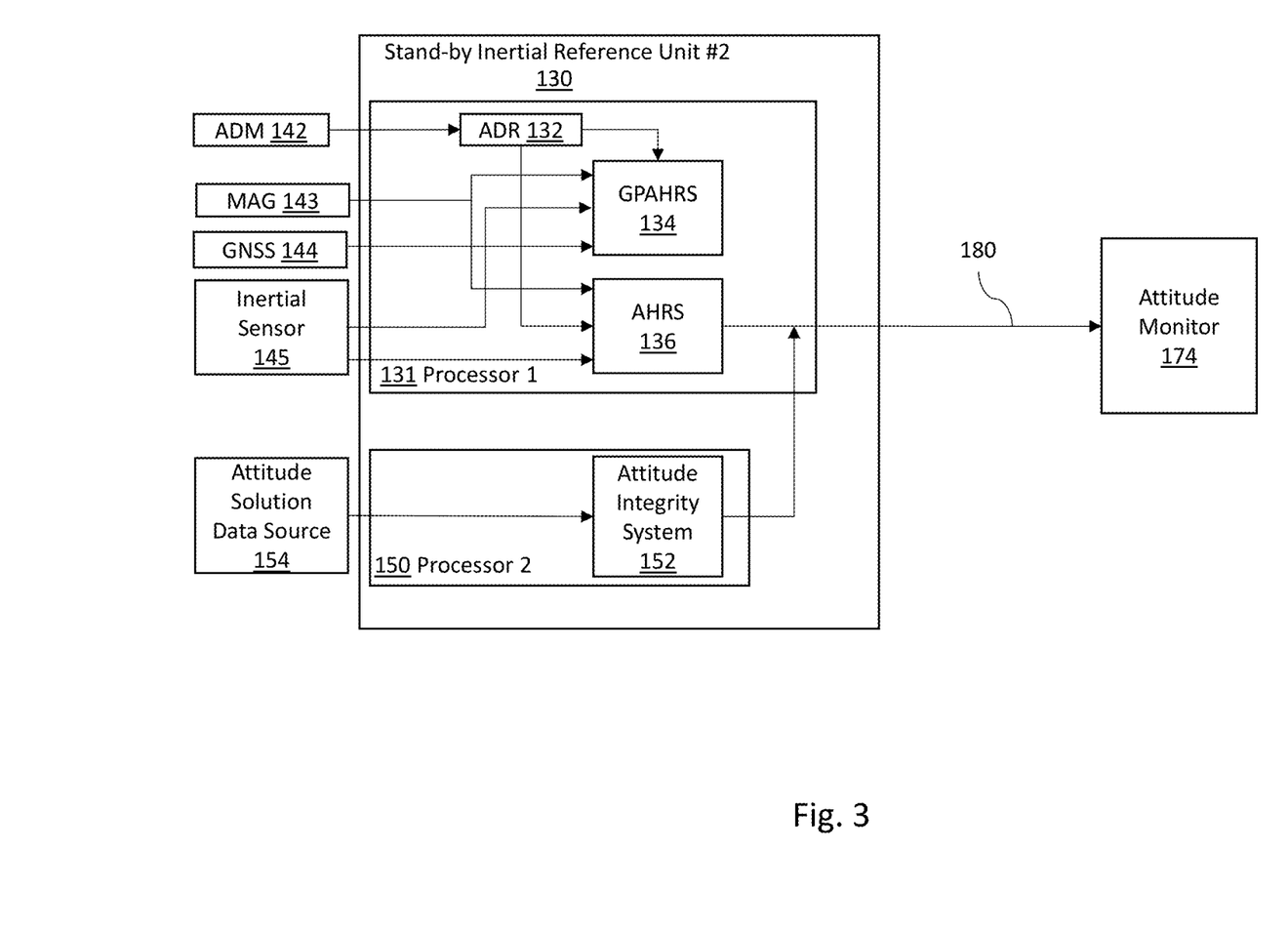
FIG. 3 is a diagram illustrating an attitude display system of one embodiment of the present disclosure.

It should be appreciated that although FIG. 1 illustrates the attitude integrity system 152 as being implemented within the hybrid reference unit 130, and the attitude monitor 174 as being implemented within the standby display system 170, this configuration is provided for example purposes only. As shown in FIG. 2, either the attitude integrity system 152, the attitude monitor 174, or both, may be implemented elsewhere as part of other on-board avionics systems. For example, one or both of the attitude integrity system 152 or the attitude monitor 174 may be integrated within the aircraft's Flight Management System (FMS) or Flight Control System (FCS).

Where the attitude integrity system is implemented within ADAHRU 130, the ADAHRU 130 may comprise a multi-processor Field Programmable Gate Array (FPGA). Calculation of the AI solution can be isolated from common undetected erroneous failures that may affect calculation of the AHRS 136 attitude solution by utilizing an independent processor running a dedicated piece of software to perform the AI attitude calculations. For example, in one embodiment, the AHRS 136 solution may be calculated using a first processor 131 resident on the FPGA. The AI solution is calculated on a second processor 150 resident on the FPGA which is coupled to attitude solution data source 154. In some embodiments, the second processor 150 producing the AI solution may communicate independently and directly with the attitude monitor 174. However, in at least one alternate embodiment, the second processor 150 packages up the AI solution in an integrity protected packet that is then sent via the first processor 131 to the attitude monitor 174, such as shown in FIG. 3. For example, in one embodiment, a single ARINC 429 bus (shown at 180) couples the ADAHRU 130 with the attitude monitor 174 (which may, or may not be implemented within the standby display system 170). In that case the first processor 131 bundles the AI solution with the secondary attitude solution from the AHRS 136 and communicates both together via the ARINC 429 within a common packet. This can be easily done with techniques such as a cyclic-redundancy-check (CRC) on the message block. Note that the AI solution does not need to be loss of function isolated from the AHRS solution.

In one implementation, the second processor 150 comprises an internal ARM processor dedicated specifically for computing independent pitch and roll parameters to generate the AI solution. The software executed by the second processor 150 would provide a diverse, independent, AI solution that computes pitch and roll based on data from the attitude solution data source 154. In one embodiment, the software executed by the attitude integrity system 152 and the attitude monitor 174 are kept minimal meaning the only include what is needed to perform the monitoring and fault identification functions discussed herein. No partitioning is needed, as there is only one application. Either a simple alternative operating system may be chosen or a simple scheduler. In one embodiment, minimal BITE will be included to support the integrity of the AI solution. In one embodiment, the data from inertial sensor 145 may be communicated to the first processor 131 on a separate SPI bus than used to communicate data from the attitude solution data source 154 to the second processor 150.

In one embodiment in operation, the two sets of primary attitude data (from ADIRU 110 and ADIRU 120), one set of secondary attitude data (from AHRS 136) and the AI solutions (from attitude integrity system 152) are provided to attitude monitor 174. When primary attitude data from both ADIRU 110 and ADIRU 120 are being received, attitude monitor 174 remains in standby mode and the AI solution from attitude integrity system 152 is either ignored, or otherwise disabled (for example by having attitude monitor 174 place attitude integrity system 152 into a standby mode). As discussed above, under some circumstances, it may be necessary for an aircraft to take-off or otherwise operate in-flight when one of the ADIRU 110 and ADIRU 120 is failed or otherwise removed from service. Attitude monitor 174 detects this condition and enters an attitude monitoring mode. For example, assuming an instance where ADIRU 110 is failed, attitude monitor 174 may sense a lack of incoming primary attitude data from ADIRU 110 (or otherwise receive a lockout or other failure indication signal) and enter monitoring mode. While in monitoring mode, attitude monitor 174 enters a process to continuously monitor and compare the primary attitude data being received from the remaining ADIRU (i.e., ADIRU 120 in this example) and the secondary attitude data received from AHRS 136. As long at these two sets of attitude data remain consistent with each other, attitude monitor 174 remains in monitoring mode. While in monitoring mode, the AI solution continues to be ignored and unused. For some implementations where the AI solution was previously disabled or attitude integrity system 152 otherwise placed in standby, that is maintained during monitoring mode. In other implementations, although the AI solution continues to be unused, the attitude integrity system 152 may be activated to start generating the AI solution in monitoring mode so that the AI solution is available to the attitude monitor 174 when necessary with minimal latency.

The condition for which the AI solution starts being utilized is when the primary attitude solution from the remaining ADIRU is different from the AHRS 136 generated secondary attitude solution by a predetermined threshold. For example, in one embodiment, as long as the primary attitude solution from the remaining ADIRU is within a pitch angle of 5°, or a roll angle of 10°, of the secondary attitude solution from the AHRS 136, the attitude monitor 174 remains in monitoring mode. However, if there is a deviation between the two attitude solutions that deviates in excess of the predetermined thresholds in either pitch or roll angle, the altitude monitor 174 immediately notifies the flight crew of an attitude miscompare (i.e., a mismatch), and enters an attitude mismatch mode. When a miscompare is detected, and attitude mismatch mode entered, the attitude monitor 174 calculates which of the two attitude solutions, the primary attitude solution from the remaining ADIRU or the secondary attitude solution from the AHRS 136 is farthest from the AI solution. That solution having the greatest deviation from the AI solution is deemed to be the failed solution. Once that determination is made, the attitude monitor 174 isolates the failed solution by displaying to the pilots via the standby display 172 which attitude channel can be trusted and which is failed.

Figure 4:
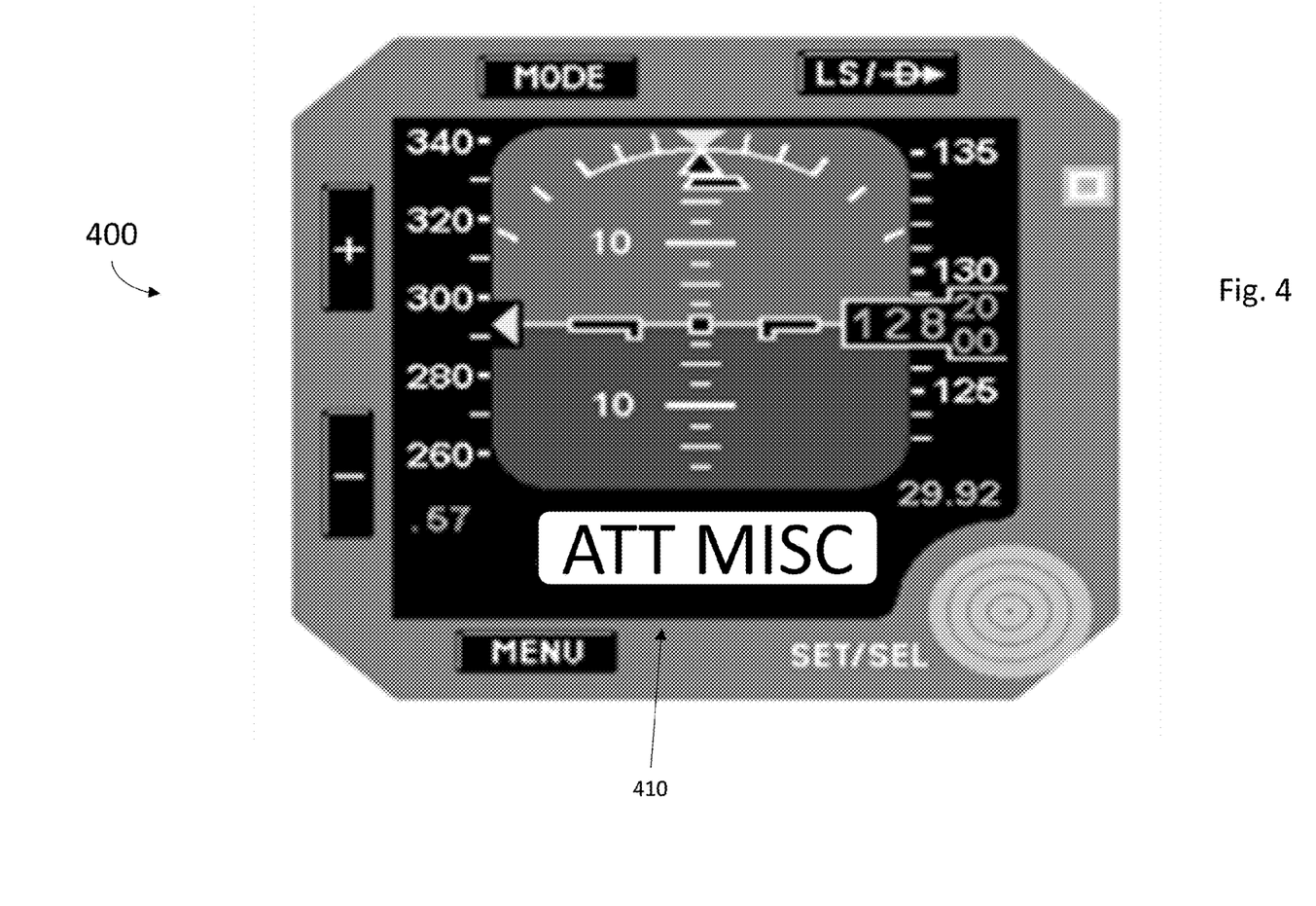
FIGS. 4, 5 and 6 are diagrams illustrating example outputs from the standby display for one embodiment of the present disclosure.

For example, FIG. 4 illustrates a sample instrumentation display 400 presented on standby display 172 indicating that the attitude monitor 174 has detected an attitude miscompare (shown as "ATT MISC" at 410), even though the attitude monitor 174 has yet to determine which solution is the failed solution. For some implementation, the time between detecting the miscompare, identifying the failed solution, and annunciating the failure might be instantaneous. This could be the case where the attitude monitor 174 has all the data necessary to perform the isolation. In other possible solutions, for example depending on the type of sensors providing the attitude solutions data source 154, a specific aircraft maneuver might be necessary for attitude integrity system 152 to calibrate itself and/or collect the data it needs to accurately calculate the AI solution. In that case, display 400 may present at 410 guidance on what maneuver the pilots need to perform in order for the attitude monitor 174 to identify and isolate the failed instrument.

Figure 5:
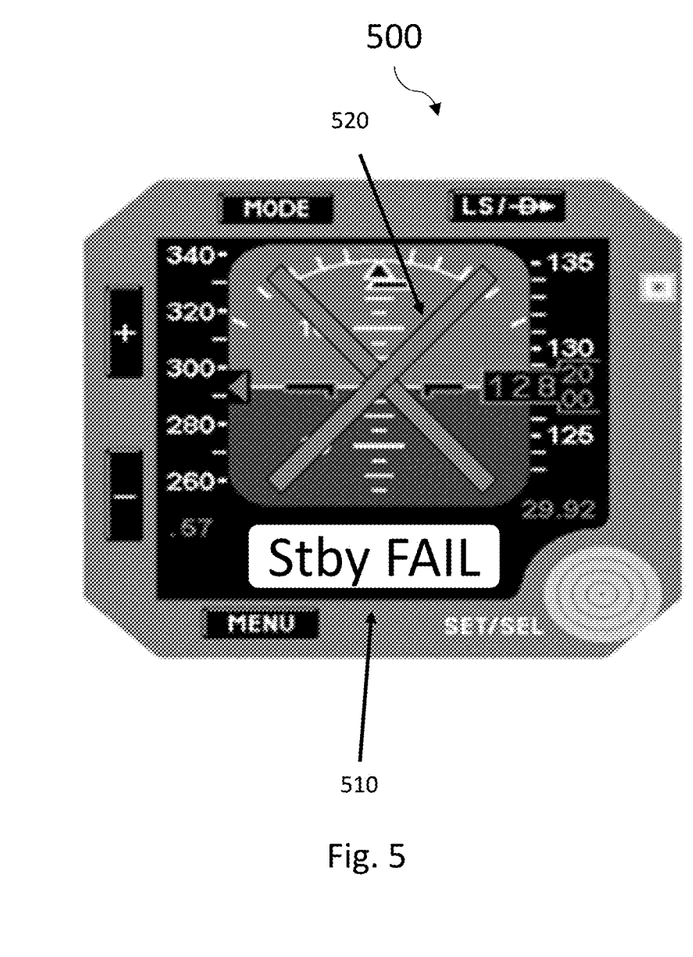
Figure 6:
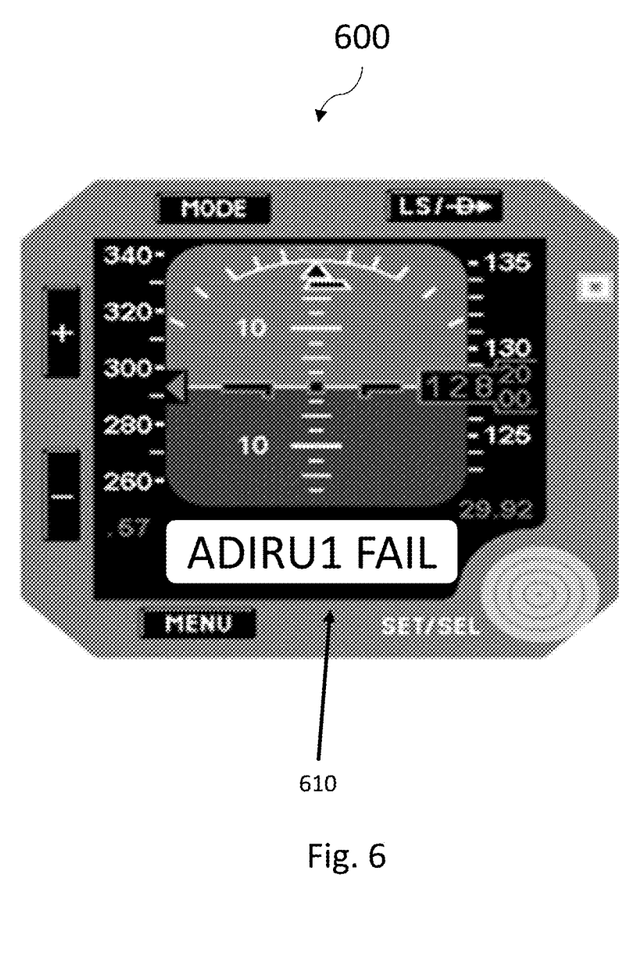

FIG. 5 illustrates an example instrumentation display 500 presented on standby display 172 that communicates to the pilot where attitude monitor 174 has isolated the fault to the secondary attitude data. As shown at 510, display 172 tells the pilot that the secondary attitude data from the AHRS 136 is failed (shown as "Stby FAIL" at 510). Display 500 may further present other symbology warning the pilot not to use that attitude channel, such as the "X" across the instrument display shown at 520. FIG. 6 illustrates an example instrumentation display 600 presented on standby display 172 that communicates to the pilot where attitude monitor 174 has isolated the fault to the primary attitude data. As shown at 610, display 600 tells the pilot that the primary attitude data from the ADURI 110 is failed (shown as "ADIRU1 FAIL" at 610). It should be noted that the symbology illustrated in the FIGS. 4, 5 and 6 is purely notional and for example purposes, and other appropriate symbology may be displayed for specific implementations. It should be appreciated that with respect to the information and warning discussed above presented on standby display 172, in alternate embodiments, any such information with respect to a failed solution may be presented on one or both of the primary or standby aircraft display systems.

Figure 7:
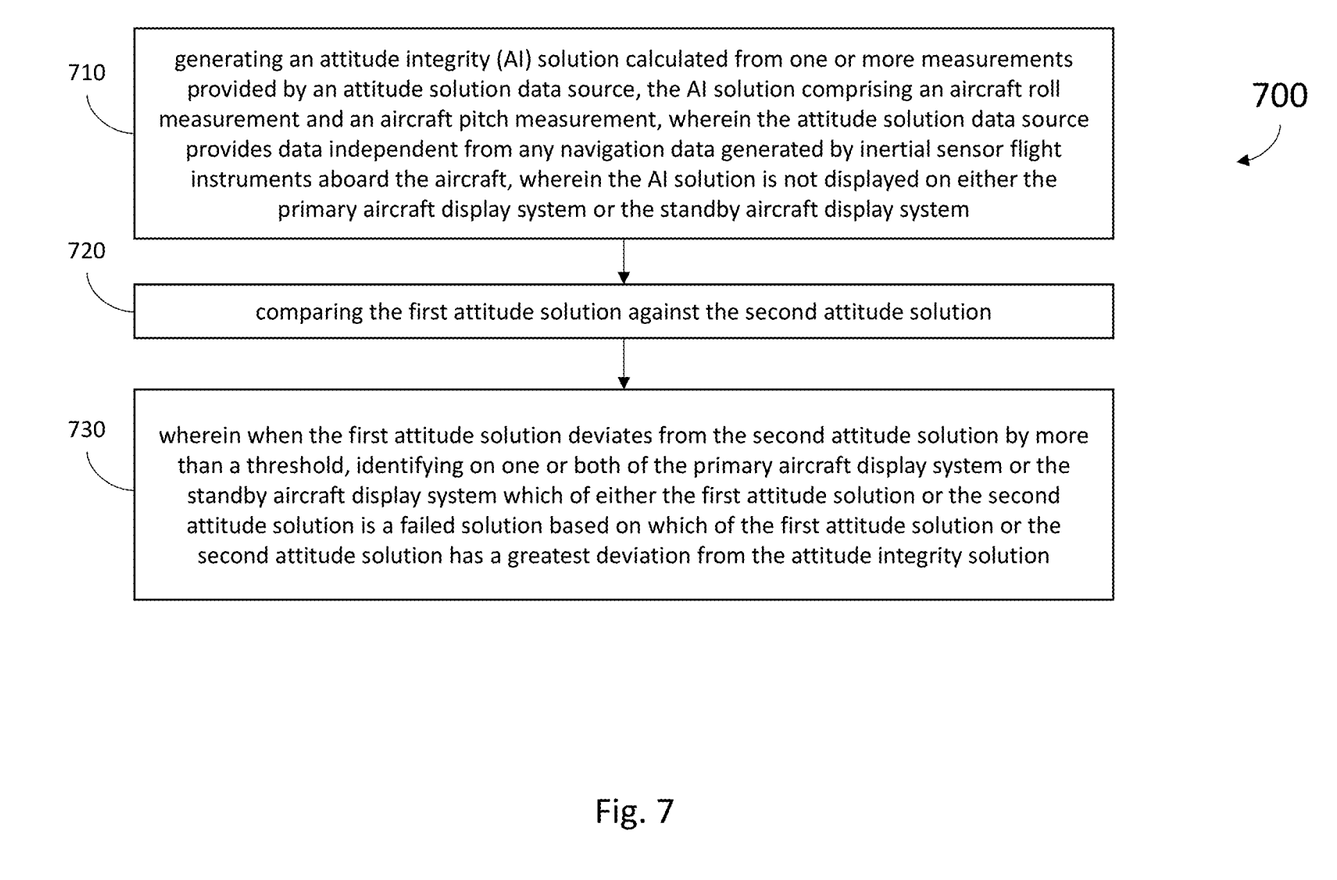
FIG. 7 is a flow chart illustrating a method of one embodiment of the present disclosure.

FIG. 7 is a flow chart illustrating a method 700 of one embodiment of the present disclosure for identifying a failed attitude solution on an aircraft having a primary aircraft display system for displaying a first attitude solution and a standby aircraft display system for displaying a second attitude solution. In one embodiment, method 700 may be implemented using the attitude display system 100 shown in FIGS. 1-3. In other implementations, other attitude display systems may instead be used. As such, any of the elements or processes, or alternates or options, described above with respect to any of the previously described embodiments may be utilized in conjunction with method 700 either in whole or in part and vice-versa.

The method begins at 710 with generating an attitude integrity (AI) solution calculated from one or more measurements provided by an attitude solution data source, the AI solution comprising an aircraft roll measurement and an aircraft pitch measurement, wherein the attitude solution data source provides data independent from any navigation data generated by a navigation-grade inertial sensor (i.e., an inertial sensor flight instrument) aboard the aircraft, wherein the AI solution is not displayed on either the primary aircraft display system or the standby aircraft display system. Embodiments of the present disclosure utilize a specialized, non-navigation grade, lower cost attitude source that is designed for the primary purpose of isolating hazardously misleading information rather than for outputting attitude information used for flying the aircraft. The primary and secondary attitude solution do need to be navigation grade solutions because the pilot is making decisions as to how to fly the aircraft based on the roll and pitch information provided by those attitude solutions. In one embodiment, the first attitude solution is a primary attitude solution generated by an air data inertial reference unit (ADIRU) while the second attitude solution is a secondary attitude solution generated by an air data attitude hybrid reference unit (ADAHRU).

The attitude integrity (AI) solution, in contrast, need only be accurate enough to provide a rough attitude solution sufficient for failure detection purposes as described above. The attitude solution data source providing data used to generate the attitude integrity (AI) solution may therefore comprise a relatively inexpensive, non-navigation grade, inertial measurement unit such as a MEMS inertial sensor, for example, or may provide sensors or other instrumentation providing one or more of inertial measurements, magnetometer measurements, GNSS measurements, air data measurements, or similar data from which aircraft attitude (pitch and roll) can be approximated, or combinations thereof. Use of such sources for generated the attitude integrity (AI) solution is far less expensive to an aircraft operator than having to install and maintain another navigation-grade attitude reference unit.

The method proceeds to 720 with comparing the first attitude solution against the second attitude solution and to 730 wherein when the first attitude solution deviates from the second attitude solution by more than a threshold, identifying on one or both of the primary aircraft display system or the standby aircraft display system which of either the first attitude solution or the second attitude solution is a failed solution based on which of the first attitude solution or the second attitude solution has a greatest deviation from the attitude integrity solution. For example, in one embodiment, as long as the first attitude solution is within a pitch angle of 5°, or a roll angle of 10°, of the second attitude solution, the method remains at block 720. However, if there is a deviation between the two attitude solutions that deviates in excess of the predetermined thresholds in either pitch or roll angle, method proceeds to 730. In one embodiment, when a miscompare is detected, an attitude mismatch mode is entered and the method at block 730 calculates which of the two attitude solutions, the first attitude solution or the second attitude solution is farthest from the AI solution. The solution having the greatest deviation from the AI solution is deemed to be the failed solution. Once that determination is made, the method isolates the failed solution by displaying to the pilots via the standby display which attitude channel is failed. In some implementations, the method may not be able to accomplish an instantaneous identification of the failed solution. Therefore in some embodiments, the method at block 730 has not yet identified which of either the first attitude solution or the second attitude solution is a failed solution, the attitude monitor displays first displays a warning on the standby display indicating that a miscompare exists between attitude solutions. In other possible implementations, for example depending on the type of sensors providing the attitude solutions data source, a specific aircraft maneuver might be necessary for the attitude integrity system to calibrate itself and/or collect the data it needs to accurately calculate the AI solution. In that case, the method at 730 may further present guidance on the standby display as to what maneuver the pilots need to perform in order for the attitude monitor to identify and isolate the failed instrument.

Example Embodiments

Example 1 includes an attitude integrity and display system, the system comprising: a primary inertial reference unit generating a primary attitude solution calculated at least in part as a function of inertial data from a first navigation-grade inertial sensor; a primary aircraft display system coupled to the primary inertial reference unit, wherein the primary aircraft display system displays the primary attitude solution; a hybrid reference unit generating a secondary attitude solution calculated at least in part as a function of inertial data from a second navigation-grade inertial sensor; a standby aircraft display system coupled to the hybrid reference unit, wherein the standby aircraft display system displays the secondary attitude solution; an attitude integrity system generating an attitude integrity (AI) solution calculated by one or more measurements provided by an attitude solution data source, wherein the attitude solution data source provides data independent from the first navigation-grade inertial sensor and the second navigation-grade inertial sensor, wherein the attitude integrity solution is not displayed on either the primary aircraft display system or the standby aircraft display system; an attitude monitor coupled to the attitude integrity system, wherein the attitude monitor includes a monitoring mode in which the attitude monitor compares the primary attitude solution against the secondary attitude solution; wherein when the primary attitude solution deviates from the secondary attitude solution by more than a predetermine threshold, the attitude monitor identifies either the primary attitude solution or the secondary attitude solution as a failed solution based on a determination of which of the primary attitude solution or the secondary attitude solution has a greatest deviation from the attitude integrity solution; and wherein the attitude monitor generates a warning on one or both of the primary or standby aircraft display system identifying the failed solution.

Example 2 includes the system of example 1, wherein the primary inertial reference unit comprises an air data inertial reference unit (ADIRU).

Example 3 includes the system of any of examples 1-2, wherein the hybrid reference unit comprises an air data attitude hybrid reference unit (ADAHRU).

Example 4 includes the system of any of examples 1-3, wherein the hybrid reference unit comprises a first processor and a second processor, wherein the secondary attitude solution is calculated by an attitude and heading reference system (AHRS) implemented on the first processor; and wherein the attitude integrity system is implemented on the second processor.

Example 5 includes the system of example 4, wherein the AI solution is communicated by the second processor to the first processor, wherein the first processor bundles the AI solution together in one or more packets with the secondary attitude solution and communicates the one or more packets to the attitude monitor.

Example 6 includes the system of any of examples 1-5, wherein the attitude solution data source provides one or more of: inertial measurements, magnetometer measurements, global navigation satellite system (GNSS) measurements, air data measurements, or combinations thereof.

Example 7 includes the system of any of examples 1-6, wherein the attitude monitor enters the monitoring mode when the primary inertial reference unit is an only remaining in-service primary inertial reference unit of a plurality of primary inertial reference units.

Example 8 includes the system of any of examples 1-7, wherein when the primary attitude solution deviates from the secondary attitude solution by more than a predetermine threshold, but the attitude monitor has not yet identified the failed solution the attitude monitor generates a warning indicating that a miscompare exists between attitude solutions.

Example 9 includes the system of any of examples 1-8, wherein when the primary attitude solution deviates from the secondary attitude solution by more than a predetermine threshold, the attitude monitor generates guidance identifying a specific aircraft maneuver for the pilot to perform.

Example 10 includes an attitude integrity and display system for an aircraft, the system comprising: a display system comprising a primary aircraft display system for displaying a first attitude solution and a standby aircraft display system for displaying a second attitude solution; an attitude integrity system generating an attitude integrity (AI) solution calculated from one or more measurements provided by an attitude solution data source, the AI solution comprising an aircraft roll measurement and an aircraft pitch measurement, wherein the attitude solution data source provides data independent from any data generated by inertial sensor flight instruments aboard the aircraft, and wherein the AI solution is not displayed on either the primary aircraft display system or the standby aircraft display system; and an attitude monitor coupled to the attitude integrity system, wherein the attitude monitor compares the first attitude solution against the second attitude solution, wherein when the first attitude solution deviates from the second attitude solution by more than a threshold, the attitude monitor identifies on the display system which of either the first attitude solution or the second attitude solution is a failed solution based on which of the first attitude solution or the second attitude solution has a greater deviation from the attitude integrity solution.

Example 11 includes the system of example 10, wherein the primary inertial reference unit comprises an air data inertial reference unit (ADIRU).

Example 12 includes the system of any of examples 10-11, wherein the hybrid reference unit comprises an air data attitude hybrid reference unit (ADAHRU).

Example 13 includes the system of any of examples 10-12, wherein when the primary attitude solution deviates from the secondary attitude solution by more than a predetermine threshold but has not yet identified which of either the first attitude solution or the second attitude solution is a failed solution, the attitude monitor displays first displays a warning indicating a miscompare exists between attitude solutions.

Example 14 includes the system of any of examples 10-13, wherein the attitude solution data source provides one or more of: inertial measurements, magnetometer measurements, global navigation satellite system (GNSS) measurements, air data measurements, or combinations thereof.

Example 15 includes the system of any of examples 10-14, wherein when the primary attitude solution deviates from the secondary attitude solution by more than a predetermine threshold, the attitude monitor displays guidance identifying a specific aircraft maneuver for the pilot to perform.

Example 16 includes a method for identifying a failed attitude solution on an aircraft having a primary aircraft display system for displaying a first attitude solution and a standby aircraft display system for displaying a second attitude solution, the method comprising: generating an attitude integrity (AI) solution calculated from one or more measurements provided by an attitude solution data source, the AI solution comprising an aircraft roll measurement and an aircraft pitch measurement, wherein the attitude solution data source provides data independent from any navigation data generated by inertial sensor flight instruments aboard the aircraft, wherein the AI solution is not displayed on either the primary aircraft display system or the standby aircraft display system; comparing the first attitude solution against the second attitude solution; wherein when the first attitude solution deviates from the second attitude solution by more than a threshold, identifying on one or both of the primary aircraft display system or the standby aircraft display system which of either the first attitude solution or the second attitude solution is a failed solution based on which of the first attitude solution or the second attitude solution has a greatest deviation from the attitude integrity solution.

Example 17 includes the method of example 16, wherein the first attitude solution is a primary attitude solution generated by an air data inertial reference unit (ADIRU).

Example 18 includes the method of any of examples 16-17, wherein the second attitude solution is a secondary attitude solution generated by an air data attitude hybrid reference unit (ADAHRU).

Example 19 includes the method of any of examples 16-18, wherein when the first attitude solution deviates from the second attitude solution by more than a predetermine threshold but has not yet identified which of either the first attitude solution or the second attitude solution is a failed solution, the attitude monitor displays first displays a warning indicating a miscompare exists between attitude solutions.

Example 20 includes the method of any of examples 16-19, wherein the attitude solution data source provides one or more of: inertial measurements, magnetometer measurements, global navigation satellite system (GNSS) measurements, air data measurements, or combinations thereof.

In various alternative embodiments, system elements, processes, or examples described throughout this disclosure, such as but not limited to the attitude integrity system or the attitude monitor, may be implemented on one or more computer systems, field programmable gate array (FPGA), or similar devices comprising a processor executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An attitude integrity and display system, the system comprising:
a primary inertial reference unit generating a primary attitude solution calculated at least in part as a function of inertial data from a first navigation-grade inertial sensor;
a primary aircraft display system coupled to the primary inertial reference unit, wherein the primary aircraft display system displays the primary attitude solution;
a hybrid reference unit comprising a first processor that generates a secondary attitude solution calculated at least in part as a function of inertial data received by the first processor from a second navigation-grade inertial sensor;
a standby aircraft display system coupled to the hybrid reference unit, wherein the standby aircraft display system displays the secondary attitude solution;
an attitude integrity system comprising a second processor that generates an attitude integrity (AI) solution calculated by one or more measurements provided to the second processor by an attitude solution data source, wherein the attitude solution data source provides data independent from the first navigation-grade inertial sensor and the second navigation-grade inertial sensor, wherein the attitude integrity solution is not displayed on either the primary aircraft display system or the standby aircraft display system;
an attitude monitor comprising a third processor coupled to the attitude integrity system, wherein the attitude monitor includes a monitoring mode in which the attitude monitor compares the primary attitude solution against the secondary attitude solution;
wherein when the primary attitude solution deviates from the secondary attitude solution by more than a predetermine threshold, the attitude monitor identifies either the primary attitude solution or the secondary attitude solution as a failed solution based on a determination of which of the primary attitude solution or the secondary attitude solution has a greatest deviation from the attitude integrity solution; and
wherein the attitude monitor generates a warning on one or both of the primary or standby aircraft display system identifying the failed solution.

2. The system of claim 1, wherein the primary inertial reference unit comprises an air data inertial reference unit (ADIRU).

3. The system of claim 1, wherein the hybrid reference unit comprises an air data attitude hybrid reference unit (ADAHRU).

4. The system of claim 1, wherein the hybrid reference unit comprises a first processor and a second processor, wherein the secondary attitude solution is calculated by an attitude and heading reference system (AHRS) implemented on the first processor; and wherein the attitude integrity system is implemented on the second processor.

5. The system of claim 4, wherein the AI solution is communicated by the second processor to the first processor, wherein the first processor bundles the AI solution together in one or more packets with the secondary attitude solution and communicates the one or more packets to the attitude monitor.

6. The system of claim 1, wherein the attitude solution data source provides one or more of:
inertial measurements, magnetometer measurements, global navigation satellite system (GNSS) measurements, air data measurements, or combinations thereof.

7. The system of claim 1, wherein the attitude monitor enters the monitoring mode when the primary inertial reference unit is an only remaining in-service primary inertial reference unit of a plurality of primary inertial reference units.

8. The system of claim 1, wherein when the primary attitude solution deviates from the secondary attitude solution by more than a predetermine threshold, but the attitude monitor has not yet identified the failed solution the attitude monitor generates a warning indicating that a miscompare exists between attitude solutions.

9. The system of claim 1, wherein when the primary attitude solution deviates from the secondary attitude solution by more than a predetermine threshold, the attitude monitor generates guidance identifying a specific aircraft maneuver for the pilot to perform.

10. An attitude integrity and display system for an aircraft, the system comprising:
a display system comprising a primary aircraft display system for displaying a first attitude solution and a standby aircraft display system for displaying a second attitude solution;
an attitude integrity system comprising a first processor that generates an attitude integrity (AI) solution calculated from one or more measurements provided to the first processor by an attitude solution data source, the AI solution comprising an aircraft roll measurement and an aircraft pitch measurement, wherein the attitude solution data source provides data independent from any data generated by inertial sensor flight instruments aboard the aircraft, and wherein the AI solution is not displayed on either the primary aircraft display system or the standby aircraft display system; and
an attitude monitor coupled to the attitude integrity system and comprising a second processor that compares the first attitude solution against the second attitude solution, wherein when the first attitude solution deviates from the second attitude solution by more than a threshold, the attitude monitor identifies on the display system which of either the first attitude solution or the second attitude solution is a failed solution based on which of the first attitude solution or the second attitude solution has a greater deviation from the attitude integrity solution.

11. The system of claim 10, wherein the first attitude solution is generated by an air data inertial reference unit (ADIRU).

12. The system of claim 10, wherein the second attitude solutions is generated by an air data attitude hybrid reference unit (ADAHRU).

13. The system of claim 10, wherein when the first attitude solution deviates from the second attitude solution by more than a predetermine threshold but has not yet identified which of either the first attitude solution or the second attitude solution is a failed solution, the attitude monitor displays first displays a warning indicating a miscompare exists between attitude solutions.

14. The system of claim 10, wherein the attitude solution data source provides one or more of:
inertial measurements, magnetometer measurements, global navigation satellite system (GNSS) measurements, air data measurements, or combinations thereof.

15. The system of claim 10, wherein when the first attitude solution deviates from the second attitude solution by more than a predetermine threshold, the attitude monitor displays guidance identifying a specific aircraft maneuver for the pilot to perform.

16. A method for identifying a failed attitude solution on an aircraft having a primary aircraft display system for displaying a first attitude solution and a standby aircraft display system for displaying a second attitude solution, the method comprising:
generating an attitude integrity (AI) solution calculated from one or more measurements provided by an attitude solution data source, the AI solution comprising an aircraft roll measurement and an aircraft pitch measurement, wherein the attitude solution data source provides data independent from any navigation data generated by inertial sensor flight instruments aboard the aircraft, wherein the AI solution is not displayed on either the primary aircraft display system or the standby aircraft display system;
comparing the first attitude solution against the second attitude solution;
wherein when the first attitude solution deviates from the second attitude solution by more than a threshold, identifying which of either the first attitude solution or the second attitude solution is a failed solution based on which of the first attitude solution or the second attitude solution has a greatest deviation from the attitude integrity solution.

17. The method of claim 16, wherein the first attitude solution is a primary attitude solution generated by an air data inertial reference unit (ADIRU).

18. The method of claim 16, wherein the second attitude solution is a secondary attitude solution generated by an air data attitude hybrid reference unit (ADAHRU).

19. The method of claim 16, wherein when the first attitude solution deviates from the second attitude solution by more than a predetermine threshold but has not yet identified which of either the first attitude solution or the second attitude solution is a failed solution, the method further comprises displaying a warning indicating a miscompare exists between attitude solutions.

20. The method of claim 16, wherein the attitude solution data source provides one or more of:
inertial measurements, magnetometer measurements, global navigation satellite system (GNSS) measurements, air data measurements, or combinations thereof.

* * * * *